Patented Apr. 19, 1938

2,114,577

UNITED STATES PATENT OFFICE 2,114,577

MEDIUM FOR COMBATING VERMIN

Gerhard Schrader, Opladen-Lutzenkirchen, Otto Bayer and Hans Kükenthal, Leverkusen-I. G. Werk, Germany, assignors to Winthrop Chemical Company, Inc., New York, N. Y., a corporation of New York No Drawing. Application April 2, 1936, Serial No. 72,444. In Germany April 3, 1935

3 Claims. (Cl. 167—22)

This invention relates to the manufacture of media for combating vermin.

We have found that sulfofluorides, the sulfofluoride group of which is bound in aliphatic linkage possess a strongly poisonous action against vermin. Methane sulfofluoride has proved to be particularly suitable. The sulfofluorides display a poisonous action which, surprisingly, in many cases exceeds that of nicotin. When using sulfofluorides for combating vermin injurious to vegetation, it is remarkable that the plants treated are not injured.

The sulfofluorides may be employed in various manners. They may be used in the gaseous phase either alone or with the addition of other inert gases or gases being effective for combating vermin, for instance, carbon dioxide, carbon monoxide, ethylene oxide or hydrocyanic acid. Also warning or irritating substances, such as chloroformic acid ester may be added to the sulfofluorides to be gasified.

Furthermore, they may be sprayed or nebulized in the form of their solutions, for instance in water or low boiling solvents, such as carbon tetrachloride, acetone, benzene, benzine, or also in admixture with unsaturated solvents, as are obtained for instance in the petroleum fractionation. To solutions or dispersions of the said kind likewise other media for combating vermin, for instance nicotin may be added. The solutions of the sulfofluorides may also be absorbed by suitable substances, for instance paper or porous substances and may then be employed.

The sulfofluorides may also be used in solid or paste-like form alone or in admixture with inert substances and/or other solid or liquid media for combating vermin. Talc or chalk may for instance serve as inert stretching agent. The sulfofluorides may be marketed in the form of powder or in the form of tablets.

The sulfofluorides may serve for combating the most varied kinds of vermin. They have proved to be especially suitable for combating *Calandra granaria*, *Tenebrio molitor* and others, bedbugs, cockroaches, lice, flies, gnats, all kinds of moths, fur-beetle, carpet-beetle and its larva, ants, plant-lice, phylloxera, shield-lice and others. The sulfofluorides may also be employed for exterminating rats, mice and the like.

The invention is further illustrated by the following examples without being restricted thereto:—

*Example 1.*—A box of 1 cbm. content is filled with various items taken from a collection, drugs, seeds and the like all of which have been attacked by vermin. 1.5 grams of methane sulfofluoride are caused to gasify in the said box. The box remained closed for 24 hours. Thereafter it was found that all vermin contained therein, such as *Calandra granaria*, *Tenebrio molitor*, different kinds of moths and bugs were killed. A test of gasified wheat strongly infected by *Calandra granaria* shows that the germinating power of the grains is not affected. The permeation-power of the gas is very good. Though the wheat was placed in a container having a longitudinal diameter of 25 cm. into which the gas could only penetrate from the top it was completely disinfected.

*Example 2.*—In a green-house of 100 cbm. content there are kept different plants which are partly strongly affected by plant lice and white flies. For killing the plant lice 10 ccs. of methane sulfofluoride are dissolved in one liter of water and the said solution sprayed in the green-house. Thereby the whole room is gasified. Spraying takes place in the evening. Upon opening the room next morning all plant lice and white flies are found to be killed. The plants attacked were blooming cineraria, roses and apple seedlings. Fuchsia, tradescantia and vine-cuttings were gasified at the same time. None of the plants was injured by the gasification.

*Example 3.*—10 kgs. of wheat are treated in a drum with 2 liters of a 1% aqueous solution of methane sulfofluoride. On thoroughly mixing, the solution is completely taken up by the grains. The water may contain a dyestuff for coloring. After the treatment the grains are dried. Two to four grains are sufficient to kill a mouse within 24 hours. The grains are readily taken by mice besides untreated fodder.

In an analogous manner instead of methane sulfofluoride which corresponds to the formula $CH_3SO_2F$ other organic compounds with sulfofluoride group bound in aliphatic linkage may be used, for instance, ethane-sulfofluoride, propylsulfofluoride, butyl-sulfofluoride, chloromethane-sulfofluoride, chloroethane-sulfofluoride; furthermore, for instance dimethylamino- and diethylamino-ethane sulfofluoride.

We claim:—

1. A medium for combating vermin, containing an alkyl-sulfofluoride, in which the alkyl group, attached to the sulfofluoride group, contains from 1 to 4 carbon atoms.

2. A medium for combating vermin, containing methane-sulfofluoride corresponding to the formula $CH_3SO_2F$.

3. A medium for combating vermin which contains an aliphatic compound with a sulfofluoride group bound in aliphatic linkage, and which compound contains from 1 to 4 carbon atoms.

GERHARD SCHRADER.
OTTO BAYER.
HANS KÜKENTHAL.